(12) United States Patent
Hensley et al.

(10) Patent No.: US 7,847,727 B2
(45) Date of Patent: Dec. 7, 2010

(54) OBJECT IDENTITY AND LOCATION TRACKING SYSTEM

(75) Inventors: Charles R. Hensley, Yukon, OK (US);
Charles Jones, Bedford, TX (US);
Kipton Moravec, Plano, TX (US)

(73) Assignee: Pinpoint Productions LLC, Yukon, OK (US)

( * ) Notice: Subject to any disclaimer, the term of this patent is extended or adjusted under 35 U.S.C. 154(b) by 0 days.

(21) Appl. No.: 11/511,838

(22) Filed: Aug. 29, 2006

(65) Prior Publication Data

US 2008/0055155 A1    Mar. 6, 2008

(51) Int. Cl.
*G01S 19/49* (2010.01)
*G01S 19/51* (2010.01)

(52) U.S. Cl. .............................. 342/357.32; 342/357.34

(58) Field of Classification Search ............ 342/357.07, 342/357.08, 357.09, 357.1, 357.14
See application file for complete search history.

(56) References Cited

U.S. PATENT DOCUMENTS

| | | | | |
|---|---|---|---|---|
| 5,731,757 A * | 3/1998 | Layson, Jr. | ............. | 342/357.07 |
| 5,781,150 A * | 7/1998 | Norris | .................... | 342/357.08 |
| 5,900,818 A | 5/1999 | Lemnell | | |
| 5,923,294 A * | 7/1999 | Bacelon et al. | ............. | 342/457 |
| 6,067,018 A | 5/2000 | Skelton et al. | | |
| 6,111,508 A | 8/2000 | Ensor et al. | | |
| 6,114,957 A | 9/2000 | Westrick et al. | | |
| 6,172,640 B1 | 1/2001 | Durst et al. | | |
| 6,236,358 B1 | 5/2001 | Durst et al. | | |
| 6,246,376 B1 * | 6/2001 | Bork et al. | ............. | 342/357.13 |
| 6,271,757 B1 * | 8/2001 | Touchton et al. | ......... | 340/573.1 |
| 6,366,202 B1 | 4/2002 | Rosenthal | | |
| 6,415,223 B1 * | 7/2002 | Lin et al. | ............... | 342/357.08 |
| 6,421,001 B1 | 7/2002 | Durst et al. | | |

(Continued)

FOREIGN PATENT DOCUMENTS

EP    1134555 A1 *   9/2001

(Continued)

OTHER PUBLICATIONS

S.W. Smith, The Scientist and Engineer's Guide to Digital Signal Processing, 2nd Ed., California Technical Publishing, p. 76, 1999.*

(Continued)

*Primary Examiner*—Thomas H Tarcza
*Assistant Examiner*—Fred H Mull
(74) *Attorney, Agent, or Firm*—Dunlap Codding, P.C.

(57) ABSTRACT

A system and method for tracking the identity and position of an object. The system includes at least one locator unit the is attached to the object to be tracked. The system also includes at least one display unit carried by or with a user. The locator unit obtains its satellite position data from a satellite positioning system such as GPS, GLONASS, GALILEO, or the like, or position data from a radio positioning system such as LORAN. The locator unit then measures local position data with one or more sensors such as accelerometers and compasses and augments the satellite position data with the local position data. The locator unit transmits the combined position data to a display unit. The display unit calculates its own position in the same way and outputs the combined position of the locator unit relative to the augmented position of the display unit via a user interface.

28 Claims, 4 Drawing Sheets

U.S. PATENT DOCUMENTS

| | | |
|---|---|---|
| 6,441,778 B1 | 8/2002 | Durst et al. |
| 6,469,628 B1 | 10/2002 | Richards et al. |
| 6,480,147 B2 | 11/2002 | Durst et al. |
| 6,501,378 B1 | 12/2002 | Knaven |
| 6,518,919 B1 | 2/2003 | Durst et al. |
| 6,535,125 B2 | 3/2003 | Trivett |
| 6,535,131 B1 | 3/2003 | Bar-Shalom et al. |
| 6,720,879 B2 | 4/2004 | Edwards |
| 6,721,681 B1 | 4/2004 | Christian et al. |
| 6,734,795 B2 | 5/2004 | Price |
| 6,771,213 B2 | 8/2004 | Durst et al. |
| 6,856,250 B2 | 2/2005 | Hilliard |
| 6,859,171 B2 | 2/2005 | Durst et al. |
| 6,888,456 B2 | 5/2005 | Cheng et al. |
| 6,989,751 B2 | 1/2006 | Richards |
| 6,989,752 B2 | 1/2006 | Shugrue |
| 7,072,668 B2 * | 7/2006 | Chou .................... 342/357.07 |
| 7,155,238 B2 * | 12/2006 | Katz ..................... 342/357.09 |
| 7,181,230 B2 * | 2/2007 | Nonoyama et al. ..... 342/357.08 |
| 7,212,097 B2 * | 5/2007 | Yoshikawa et al. ......... 340/5.28 |
| 7,254,479 B2 * | 8/2007 | Cheon ................... 342/357.09 |
| 2003/0052815 A1 * | 3/2003 | Russell et al. ............ 342/357.1 |
| 2004/0059502 A1 * | 3/2004 | Levi et al. ................... 701/224 |
| 2004/0201454 A1 * | 10/2004 | Waterhouse et al. ....... 340/10.1 |
| 2005/0160062 A1 * | 7/2005 | Howard et al. ................. 707/1 |
| 2006/0011144 A1 * | 1/2006 | Kates ........................ 119/719 |
| 2006/0100777 A1 * | 5/2006 | Staton et al. ................ 701/200 |
| 2008/0091373 A1 * | 4/2008 | McGibbon et al. ............ 702/95 |

OTHER PUBLICATIONS

"augment." Collins English Dictionary. London: Collins, 2000.*
augment. (2000). In Collins English Dictionary. Retrieved from http://www.credoreference.com/entry/hcengdict/augment.*

* cited by examiner

OBJECT IDENTITY AND LOCATION TRACKING SYSTEM

CROSS REFERENCE TO RELATED APPLICATIONS

Not applicable.

BACKGROUND OF THE INVENTION

1. Field of the Invention

This invention relates generally to a system for identifying and locating an object. More specifically, but not by way of limitation, this invention relates to an electronic system utilizing one or more sensors to measure the motion of an object and augment satellite position data obtained with known satellite positioning methods.

2. Brief Description of Related Art

In recent years, numerous systems and methods have been proposed and developed for tracking the location of an object. Larger, more expensive systems exist for tracking the position of delivery trucks and the like. These systems largely rely on vehicle power systems and are thus poorly suited to use on smaller objects.

One especially problematic application of such a system is for tracking relatively small objects or animals, such as domestic pets, hunting dogs, or livestock, which may move in a nearly infinite combination of directions and distances. Several systems have been created to address this specific application.

These systems utilize a variety of methods to track an object's position. One such system measures the relative strength of a radio frequency signal emitted from a transponder attached to the object to determine a direction and approximate distance from the transponder to a display unit. Another system utilizes a GPS (Global Positioning System) receiver to obtain the object's position and transmits the position data to a display unit. Yet another positioning system utilizes a GPS receiver to obtain the object's position, as well as a compass to determine the object's orientation. These GPS systems then use existing telephonic cellular and paging networks to transmit the object's location information to a display unit such as a cellular phone or computer.

Several significant problems remain with the above mentioned systems. Measuring the strength of radio frequencies is relatively inaccurate and makes it extremely difficult to calculate or display direction of travel. Further, radio frequency systems are not well suited to differentiating between multiple objects or uniquely identifying such objects.

Positioning systems which rely solely on GPS or other satellite data are susceptible to inconsistent performance in treed or overgrown areas where the GPS receiver cannot maintain simultaneous line-of-sight communication with at least three satellites. Systems mounted on shorter animals, such as hunting dogs, are even more susceptible to interruption since bushes and tall grasses may obscure the GPS receiver.

Thus, there exists a need for a position tracking system which can track changes in position and augment GPS position with locally-measured data to more reliably track the position of an object. There exists a further need for a tracking system which can monitor the position of multiple objects while allowing the user to differentiate between them.

Other features, advantages, and objects of the present embodiment will become apparent to those of at least ordinary skill in the art when the following description is read in light of the attached drawings and appended claims.

SUMMARY OF THE INVENTION

The object identity and location tracking system described in the present disclosure and claimed herein utilizes at least one locator unit and at least one display unit. The locator unit is attached to the object to be tracked and determines the position of the object as follows. A receiver in the locator unit receives satellite position data from a satellite positioning system such as GPS, GLONASS, or GALILEO, or position data from a radio positioning system such as loran. The locator system measures local position data using one or more sensors such as an accelerometer and a compass. The satellite position data is then augmented with the local position data to generate the current position of the object. Augmented position data and a unique locator ID are then transmitted wirelessly, for example via an RF communications transceiver, to all display units operating on a group ID.

In the preferred embodiment, the display unit tracks its own position using the same method as the locator unit. The display unit receives augmented position data from one or more locator units and normalizes the augmented position data relative to the position of the locator. Thus, the position of the display unit is used as the origin and the relative position of the locator unit is output to the user via a user interface.

The display units and locator units can optionally be adapted to act as "repeaters" to relay position data to display units that are out of communication range. In another embodiment, the display units may be adapted to transmit their own augmented position data to other display units such that members of a party can track their own positions relative to one another as well as the positions of the locator units.

DETAILED DESCRIPTION OF THE INVENTION

Figure 1:
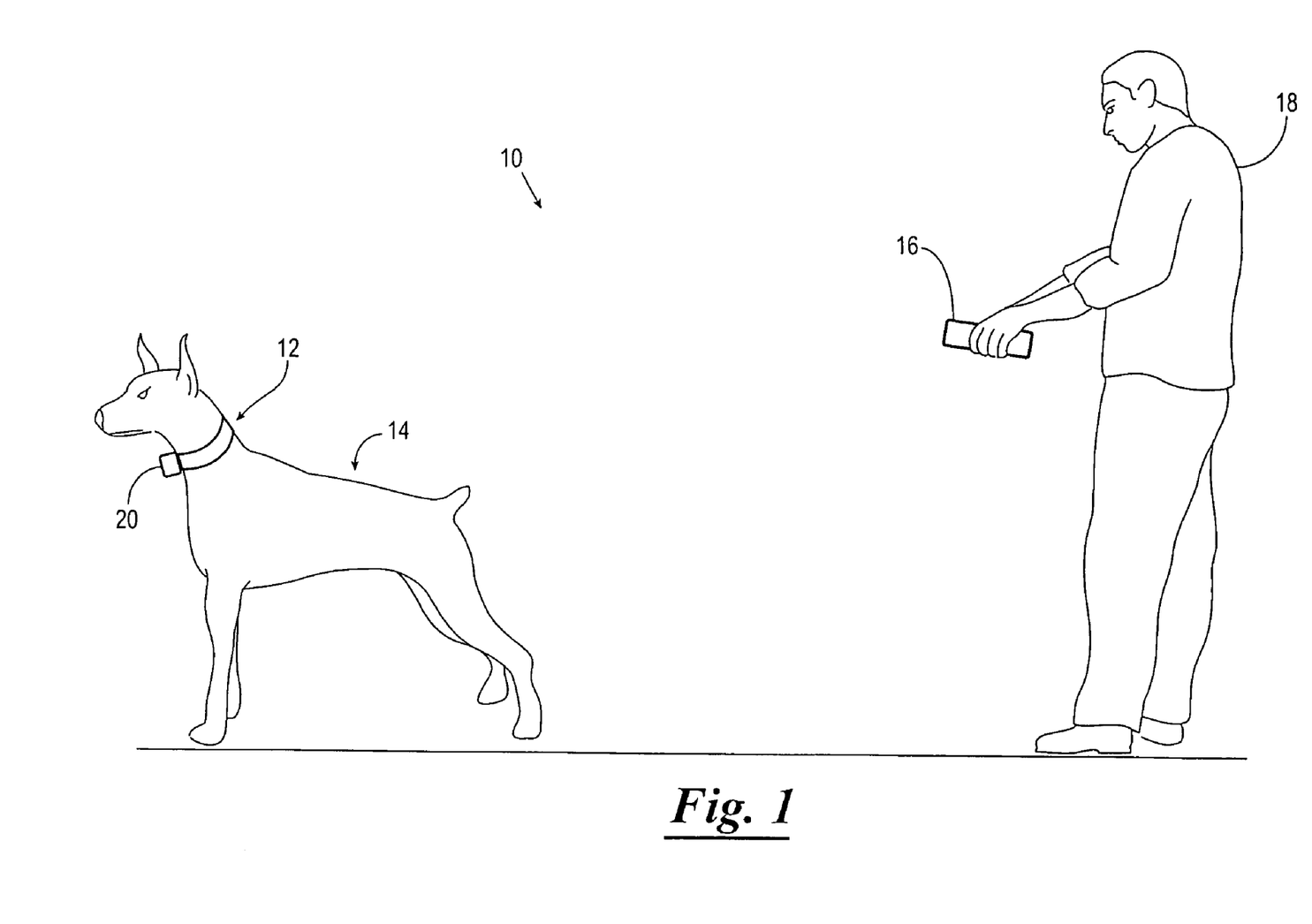
FIG. 1 is a perspective view of an individual using an object identity and tracking system constructed in accordance with the present invention to track the location of a dog.

Referring now to the drawings and more particularly to FIG. 1, an object identity and position tracking system 10 (hereinafter referred to as the system) is shown. The system 10 includes one or more locator units 12, each attached or coupled to an object 14 such as a dog, child, person, car, or the like; and one or more display units 16, each disposed so as to be available to a user 16. The locator unit 12 calculates the position of the object 14 by obtaining satellite position data through known satellite positioning methods. The locator unit 12 then measures local position data, augments the satellite position data with local position data, and outputs augmented position data to the display unit 16.

The display unit 16 calculates its own position using a similar method and receives the augmented position data from the locator unit 12. The display unit 16 then outputs the position of the locator unit 12 to the user 18 via a user interface. The position of the locator unit 12 may be output in any form that allows the user 18 to locate the object 14, for example Cartesian or polar coordinates, bearing, distance and bearing, closest landmarks, relative position on a map, or the like.

Figure 2:
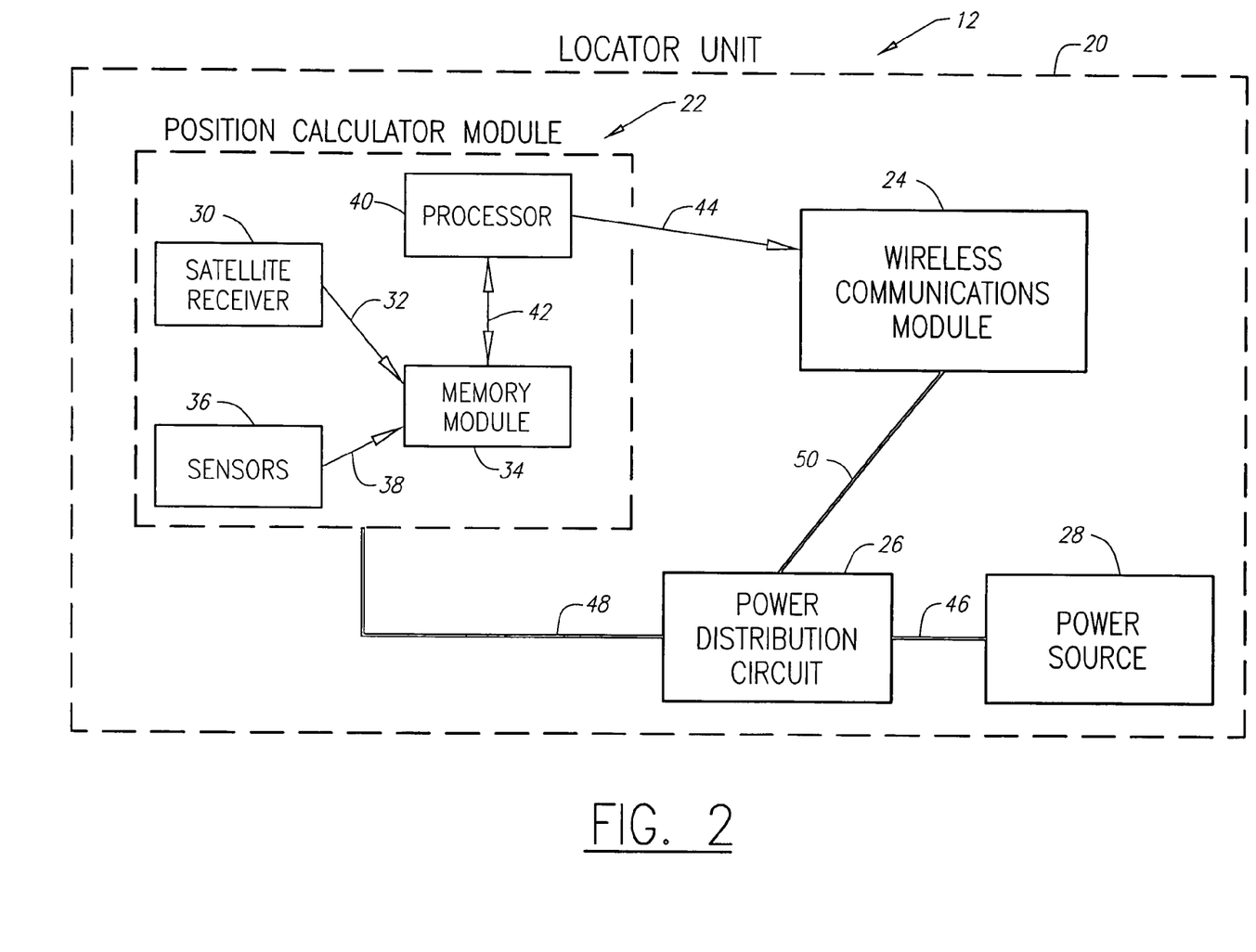
FIG. 2 is a block diagram of a display unit.

Referring now to FIG. 2, a locator unit 12 constructed in accordance with the present invention is shown. The locator unit 12 has one or more housings 20 to support its components directly or indirectly, for example components may be attached directly to the housing, to other components, or to brackets or mounts attached to the housing or other components. The housing 20 may be adapted to attach to an object 14 (FIG. 1) using an appropriate method. For example, the locator unit 12 may be adapted for attachment to an animal such as by fastening the housing 20 to a collar by any suitable means such as rivets, clips, velcro, clamps or the like. The locator unit 12 may also be attached directly to an object by any suitable means such as screws, rivets, magnets, clips, adhesive, or the like. In one embodiment, the locator unit 12 is provided with a position calculator module 22, a wireless communication module 24, a power distribution circuit 26, and a power source 28.

The position calculator module 22 is supported by the housing 20 and is responsible for calculating the position of the locator unit 12, and thus the position of the object 14 (FIG. 1) to which it is attached. The position calculator module 22 has a satellite receiver 30 for periodically receiving satellite position data from a satellite positioning system such as GPS, GLONASS, GALILEO, or the like. Receivers of this type are known in the art and the satellite receiver 30 includes any necessary antennas or controllers for periodically receiving transmissions from the satellite positioning system and outputting a signal containing the satellite position data.

The satellite receiver 30 outputs the signal containing the satellite position data via communication path 32 to a memory module 34. The communication path 32 and all other communication paths in the locator unit 12 may be constructed from conductive wire such as copper, aluminum, or the like; fiber-optic strands or cables; conductive paths or traces on a circuit board; air-way communications, such as radio-frequency or inductive loop coupling; or any other means which allow transmission of signals or power.

The memory module 34 receives signals from the satellite receiver 30 and stores the satellite position data. The memory module may be of any suitable electronic storage format such as random access memory (RAM), flash memory, or the like. The memory module 34 may also include a RAM component and a read only memory (ROM) component.

The position calculator module 22 also has one or more sensors 36 that measure local position data and output a signal containing the local position data. The sensors output the signal containing the local position data to the memory module 34 via communication path 38. The memory module 34 stores the local position data along with the satellite position data for later retrieval.

In the preferred embodiment, an accelerometer and a compass are used for the sensors 36, such that acceleration and direction of travel can be measured. Speed and distance traveled can then be calculated from the acceleration. In other embodiments, the sensors 36 may be any single sensor or combination of sensors such as an accelerometer, a compass, a magnetometer, a gyroscope, or the like. Thus, local position data may be any number of measurements from the sensor that could assist in tracking the object.

The position calculator module 22 also contains a processor 40. The processor 40 interfaces with the memory module 34 via communication path 42 to retrieve the satellite position data and the local position data. The processor 40 augments the satellite position data with the local position data to generate an updated or augmented position for the object. The processor 40 then sends the augmented position data to the memory module 34 for storage. The processor 40 also receives augmented position data from the memory module 34 and outputs a signal containing the augmented position data via communication path 44 to the wireless communication module 24.

The processor 40 serves as the controller for the position calculator module 22. In other embodiments, the processor 40 may receive signals directly from the satellite receiver 30 or the sensors 36. Further, the processor 40 and the memory module 34 may be combined into a single unit, or the memory module 34 may be omitted such that the satellite receiver 30 and the sensors 36 send signals directly to the processor 40 and the processor 40 outputs augmented position data to the wireless communication module 24 without storing the data locally.

The wireless communication module 24 is preferably supported by the housing 20, although the wireless communication module 24 could be provided separately The wireless communication module 24 receives the signal containing augmented position data from the processor 40 and transmits the augmented position data with a unique locator ID to at least one display unit 16 or other receiver. In the preferred embodiment, the wireless communication module 24 also transmits a group ID that is common to locator units 12 and display units 16 that are operating together.

In the preferred embodiment, the wireless communication module 24 utilizes an RF transceiver. The wireless communication module 24 includes any antennas and controllers necessary to receive the signal from the processor 40 and transmit the augmented position data. The wireless communication module 24 may be any suitable wireless communication device such as an RF transceiver, a device for communicating via cellular and paging networks, an infrared communication device, or the like.

Figure 4:
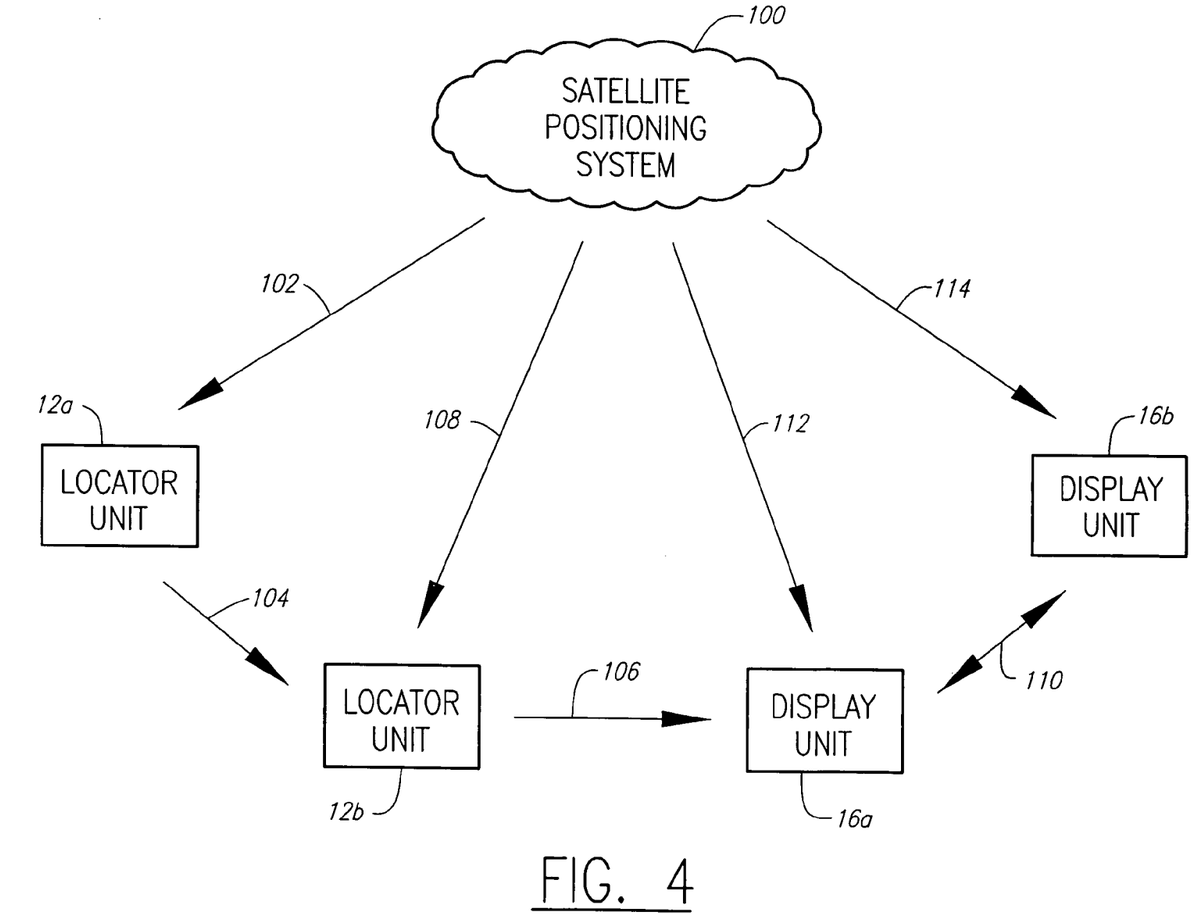
FIG. 4 is a block diagram of an object identity and position tracking system utilizing the locator unit and the display unit.

In other embodiments, the wireless communication module 24 may be adapted to act as a "repeater" or relay when used in a group including more than a single locator unit 12 and a single display unit 16. In such an embodiment, the wireless communication module 24 receives and re-transmits augmented position data from other locator units 12. Thus, the augmented position data from a first locator unit 12a could be transmitted to a display unit 16a via a second locator unit 12b, as long as the second locator unit 12b is within communication range of both the first locator unit 12a and the display unit 16a (FIG. 4).

The power source 28 is preferably supported by the housing 20, although the power source 28 could be supplied separately from the housing 20. In the preferred embodiment, the power source 28 is one or more batteries. These batteries are preferably removable and interchangeable. Other embodiments may utilize any suitably portable power source, such as a kinetic generator, a solar panel, or the like. The power source 28 typically provides current via a communication path 46 to the power distribution circuit 26.

The power distribution circuit 26 receives the current from the power source 28 and distributes it to the position calculator module 22 typically via a communication path 48 and to the wireless communication module 24 via a communication path 50. In the preferred embodiment, the power distribution circuit 26 is a wiring harness that distributes the current from the power source 28 to the position calculator module 22 and the wireless communication module 24. In other embodiments, the power distribution circuit 26 may be a circuit board, direct connections to the power source 28, or the like.

The power distribution circuit 26 may also regulate the amount of current or voltage that is allowed to pass to the respective modules.

Figure 3:
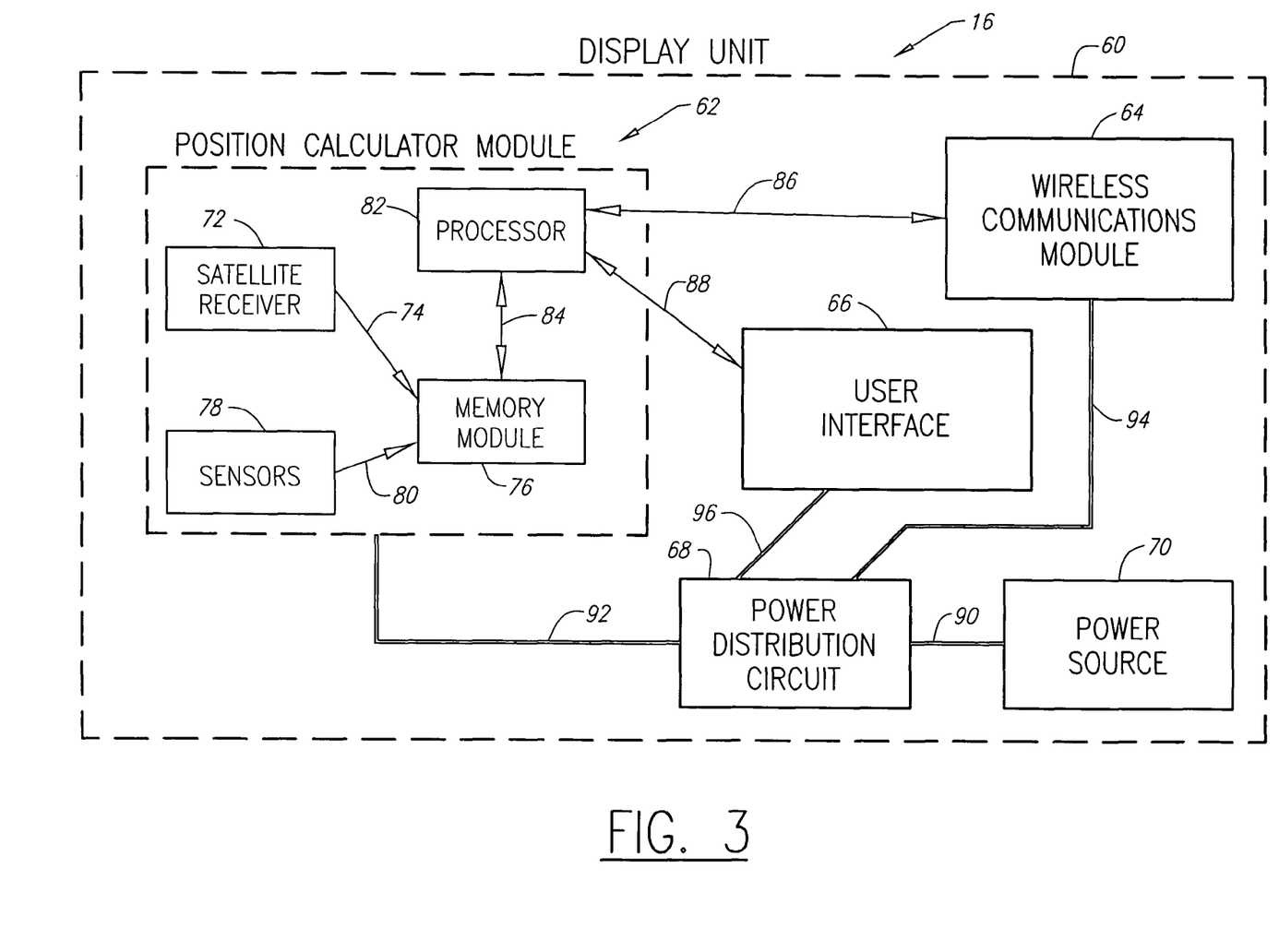
FIG. 3 is a block diagram of a locator unit.

Referring now to FIG. 3, a display unit 16 constructed in accordance with the present invention is shown. The display unit 16 has one or more housings 60 to support its components directly or indirectly, for example components may be attached directly to the housing, to other components, or to brackets or mounts attached to the housing or other components. The housing 60 may be adapted to be transported with or carried by a user. For example, the display unit 16 may be adapted to be carried by a handle, shoulder strap, belt loop, or the like. The housing 60 of the display unit 16 may also be adapted to attach to a vehicle such as to the dash board of a car or all terrain vehicle (ATV) by any suitable fastening means such as screws, rivets, bolts, brackets, clips, adhesive, or the like. In one embodiment, the display unit 16 is provided with a position calculator module 62, a wireless communication module 64, a user interface 66, a power distribution circuit 68, a power source 70.

The position calculator module 62 is supported by the housing 60 and is responsible for calculating the position of the display unit 16. The position calculator module 62 has a satellite receiver 72 for periodically receiving satellite position data from a satellite positioning system such as GPS, GLONASS, GALILEO, or the like. Receivers of this type are known in the art and the satellite receiver 72 includes any necessary antennas or controllers for periodically receiving transmissions from the satellite positioning system and outputting a signal containing the satellite position data.

The satellite receiver 72 outputs the signal containing the satellite position data via communication path 74 to a memory module 76. Communication path 74 and all other communication paths in the locator unit 16 may be constructed from conductive wire such as copper, aluminum, or the like; fiber-optic strands or cables; conductive paths or traces on a circuit board; air-wave communications, such as radio-frequency or inductive loop coupling; or any other means which allow transmission of signals or power.

The memory module 76 receives signals from the satellite receiver 72 and stores the satellite position data. The memory module 76 may be in any suitable electronic storage format such as random access memory (RAM), flash memory, or the like and may include a RAM component and a read only memory (ROM) component.

The position calculator module 62 also has one or more sensors 78 that measure local position data and output a signal containing the local position data. The sensors 78 output the signal containing the local position data to the memory module 76 via communication path 80. The memory module 76 stores the local position data along with the satellite position data for later retrieval.

In the preferred embodiment, an accelerometer and a compass are used for the sensors 78, such that acceleration and direction of travel can be measured. Speed and distance traveled can then be calculated from the measured acceleration. In other embodiments, the sensors 78 may be any single sensor or combination of sensors such as an accelerometer, a compass, a magnetometer, a gyroscope, or the like. Thus, local position data may be any number of measurements from the sensor that could assist in tracking the object.

The position calculator module 62 also contains a processor 82. The processor 82 interfaces with the memory module 76 via communication path 84 to retrieve the satellite position data and the local position data. The processor 82 augments the satellite position data with the local position data to generate an updated or augmented position for the object. The processor 82 then sends the augmented position data via communication path 84 to the memory module 76 for storage.

The processor 82 serves as the controller for the position calculator module 62. In other embodiments, the processor may communicate or receive signals directly from the satellite receiver 72 or the sensors 78. Further, the processor 82 and the memory module 76 may be combined into a single unit, or the memory module 76 may be omitted such that the satellite receiver 72 and the sensors 78 send signals directly to the processor 82.

The wireless communication module 64 is preferably supported by the housing 60, although the wireless communication module 64 could be provided separately. The wireless communication module 64 receives the augmented position data from the locator unit 12 (FIG. 2). The wireless communication module 64 sends a signal containing the locator unit's 12 augmented position data to the processor 82 via communication path 86. The processor 82 interfaces with the memory module 76 via communication path 84 to store the locator unit's augmented position data. In the preferred embodiment, the processor 82 normalizes the augmented position of the locator unit 12 relative to the augmented position of the display unit 16. The processor 82 outputs a signal containing the locator unit's 12 relative position to the user interface 66 via communication path 88 and optionally to the wireless communication module 64 via communication path 86. In other embodiments, the processor 82 may interface with the memory module 76 via communication path 84 to store the locator unit's 12 relative position.

The user interface 66 is preferably supported by the housing 60, but may be provided separately from the housing 60. The user interface 66 receives the signal containing the relative position of the locator unit 12 and outputs the relative position in a format perceivable by the user. The position may be output in Cartesian coordinates, polar coordinates, distance and bearing, or any other format which allows the relative or absolute position of the locator unit 12 to be discovered by the user. In the preferred embodiment, the augmented position of the locator unit 12, and thereby the object, may be displayed graphically relative to the augmented position of the display unit 16, for example on a map. That is, the augmented position of the display unit 16 may be subtracted from the augmented position of the locator unit 12, such that the user interface 66 displays the augmented position of the locator unit 12 relative to an origin or zero point which represents the augmented position of the display unit 16. Similarly, the augmented position of the locator unit 12 may be output in absolute form along with the augmented position of the display unit 16. In other embodiments, the position may be output audibly, as a text printout, as a text message to a cell phone, in an email, or the like.

The user interface 66 may also receive commands from the user, such as keystrokes, pre-programmed buttons, screen touches, or audible commands. These commands are converted to corresponding signals by the user interface and are sent to the processor to effect an action, for example to change display settings, retrieve previously-stored position data, refresh currently displayed position data, or the like.

In the preferred embodiment, the user interface 66 includes a display screen such as a liquid crystal display (LCD) and a keyboard with buttons pre-programmed for certain commands. In other embodiments, the user interface may include a touchscreen, a microphone and a speaker for interfacing with audible input and output, an LCD display and standard QWERTY keyboard, an LCD display and joystick or scrollwheel, or any other device or combination of devices which allow the user interface 66 to receive commands from the user and output position data in a format perceivable by the user.

In a further embodiment, the display unit 16 could transmit it's own augmented position data to other display units 16 such that users could monitor the position of other display units 16 in addition to the locator unit 12. In such an embodiment, a signal containing augmented position data for the display unit 16 is output from the processor 82 via communication path 86 to the wireless communication module 64. The signal is transmitted from the wireless communication module 64 of a first display unit 16*a* (FIG. 4) with the group ID as well as a unique display ID. A second display unit 16*b* then receives and displays the position of the first display unit 16*a* in the manner described above for receiving and displaying augmented position data for the locator unit 12.

In yet another embodiment, the wireless communication module 64 may be adapted to act as a "repeater" or relay when used with one or more other locator units 12 or display units 16. In such an embodiment, the wireless communication module 24 receives and re-transmits augmented position data from other locator units 12. Thus, the augmented position data from a locator unit 12*b* can be transmitted to a second display unit 16*b* via a first display unit 16*a*, as long as the second display unit 16*b* is within communication range of both the locator unit 12*b* and the first display unit 16*a* (FIG. 4).

The power source 70 is preferably supported by the housing 60, although the power source 70 could be provided separately from the housing 60. In the preferred embodiment, the power source 70 is one or more batteries. These batteries are preferably removable and interchangeable. Other embodiments may utilize any suitably portable power source, such as a kinetic generator, a solar panel, or the like. The power source 70 typically provides current via a communication path 90 to a power distribution circuit 68.

The power distribution circuit 68 is receives the current from the power source 70 and distributes it to the position calculator module 62 typically via communication path 92, to the wireless communication module 64 typically via communication path 94, and to the user interface 66 via communication path 96. In the preferred embodiment, the power distribution circuit 68 is a wiring harness that distributes the current from the power source 70 to the position calculator module 62, the wireless communication module 64, and the user interface 66. In other embodiments, the power distribution circuit 68 may be a circuit board, direct connections to the power source, or the like. The power distribution circuit 68 may regulate the amount of current or voltage that is allowed to pass to the respective modules.

In one embodiment, the sensors 78 may be omitted from the display unit 16 to reduce the cost of the display unit 16. In this embodiment, the display unit would track it's own position using only the satellite position data. If the satellite transmission containing the satellite position data were unavailable at a certain location, the user 18 would simply relocate the display unit 16 to a location where the satellite transmissions could be received from the satellite position system 100 (FIG. 4).

Referring now to FIG. 4, the system 10 is shown. A satellite position system 100 such as GPS, GLONASS, GALILEO, or the like transmits satellite position data from multiple individual satellites. A first locator unit 12*a* receives the satellite position data via transmission path 102. It should be noted that the satellite positioning system 100 includes multiple satellites and transmission paths therefrom include transmissions from at least three individual satellites which are received simultaneously.

As described above, the first locator unit 12*a* measures its local position data and augments the satellite position data with the local position data. The first locator unit 12*a* transmits its augmented position data with the group ID and a unique locator ID via transmission path 104. The second locator unit 12*b* receives the augmented position data from the first locator unit 12*a* and "repeats" or relays the transmission via transmission path 106.

The second locator unit 12*b* receives satellite position data via transmission path 108, measures local position data, and augments the satellite position data with local position data. The second locator unit 12*b* then transmits its own augmented position data with the group ID and a unique locator ID via transmission path 106.

A first display unit 16*a* receives the augmented position data with the group ID and unique locator ID's for the first and second locator units 12*a* and 12*b*, stores it locally, and "repeats" or relays the transmission via transmission path 100.

The first display unit 16*a* receives satellite position data via transmission path 102, measures local position data, and augments the satellite position data with the local position data. The first display unit 16*a* normalizes the augmented position data for the first and second locator units 12*a* and 12*b* relative to its own augmented position data and displays the relative position of each locator unit to the user. The first display unit 16*a* then outputs its own augmented position data with the group ID and a unique display ID via transmission path 100.

A second display unit 16*b* receives and stores the augmented position data with the group ID and unique locator ID's for locator units 12*a* and 12*b*. The second display unit 16*b* also receives and stores the augmented position data with the group ID and unique locator ID for the first display unit 16*a*.

The second display unit 16*b* receives satellite position data via transmission path 104, measures local position data, and augments the satellite position data with the local position data. The second display unit 16*b* normalizes the augmented position data for the first and second locator units 12*a* and 12*b* and the first display unit 16*a* relative to its own augmented position data and displays the relative position of each locator unit and the first display unit via the user interface 66 (FIG. 3). The second display unit 16*b* then outputs its own augmented position data with the group ID and a unique display ID to the first display unit 16*a* via transmission path 100. Thus, the first display unit 16*a* normalizes the position of the second display unit 16*b* relative to the position of the first display unit 16*a* and outputs the relative position of the second display unit 16*b* via the user interface 66 (FIG. 3) along with the relative positions of the first and second locator units 12*a* and 12*b*.

For the embodiment depicted in FIG. 4, utilizing more than a single locator unit 12 and a single display unit 16, the processors 40 (FIG. 2) in the locator units 12*a* and 12*b* and the processors 82 (FIG. 3) in the display units 16*a* and 16*b* each may select a random time "slice" and certain intervals thereafter to transmit augmented position data. For example, the first locator unit 12*a* may randomly select a time "slice" of 1 minute and 30 seconds after the hour and re-transmit every 5 minutes thereafter. Similarly, the first display unit 16*a* may select a time "slice" of 2 minutes after the hour and re-transmit every 5 minutes thereafter. In the event that more than one locator unit 12 or display unit 16 randomly select the same time slice or their transmissions overlap, each will randomly select a new time slice. Further embodiments may also be adapted to synchronize internal clocks and systematically select time "slices" to eliminate the possibility of overlapping transmissions and re-calibration.

The following is an example of a sequence that may be utilized to track the identity and position of an object with one embodiment of the present invention.
1. A user activates the display unit 16 such that the power source 70 supplies power to the components of the display unit 16 via the power distribution circuit 68.
2. The user activates the locator unit 12 such that the power source 28 supplies power to the components of the locator unit 12 via the power distribution circuit 26.
3. The user attaches the locator unit 12 to the object 14.
4. The locator unit 12 receives satellite position data from the satellite positioning system via the satellite receiver 30.
5. The locator unit 12 stores the satellite position data in the memory module 34.
6. The locator unit 12 collects local position data with sensors 36.
7. The locator unit 12 stores the local position data in the memory module 34.
8. The locator unit 12 uses the processor 40 to the augment satellite position data with the local position data.
9. The locator unit 12 stores the augmented position data in the memory module 34.
10. The locator unit 12 transmits the object's augmented position data via the wireless communication module 24.
11. The display unit 16 receives the object's augmented position data via the wireless communication module 64.
12. The display unit 16 stores the object's augmented position data in the memory module 76.
13. The display unit 16 receives satellite position data from the satellite positioning system via the satellite receiver 72.
14. The display unit 16 stores the satellite position data in the memory module 76.
15. The display unit 16 collects local position data with sensors 78.
16. The display unit 16 stores the local position data in the memory module 76.
17. The display unit 16 uses the processor 82 to the augment satellite position data with the local position data.
18. The display units 16 stores its own augmented position data in the memory module 76.
19. The display unit 16 uses the processor 82 to normalize the locator unit's 12 and thus the object's 14 augmented position data relative to the augmented position of the display unit 16.
20. The display unit 16 outputs the relative position of the locator unit 12 via a user interface 66.

1. Example

In one example, the object identity and position tracking system 10 includes at least one locator unit 12 and one display unit 16. More than one display unit 16 may be incorporated into the system 10, and more than one locator unit 12 will typically be used in the system 10. The purpose of the system 10 is to accurately determine the position of the object 14 to which the locator unit 12 is attached (e.g. a dog, child, person, or the like), relative to the position of the display unit 16; and to determine if the object 14 is moving or stationary on a continuous basis.

Satellite position data is simultaneously preferably received from at least four satellite signals in order to accurately determine position of the locator unit 12. The design of the system 10 includes position calculator modules 22 and 62. The position calculator modules 22 and 62 use sensors 36 and 78 to collect local position data to augment the satellite position. In one embodiment, the sensors 36 and 78 include a two-axis accelerometer and compass. During periods of time when current satellite position data is unavailable, the position calculator module 32 will accurately calculate and transmit the object's position co-ordinates by updating or augmenting the last valid satellite position data with the distance and direction traveled that is obtained from the sensors 36 and 78. When a new satellite position is obtained (at least 3 satellite signals are received), the local position data will be zeroed and recalculated from that point.

In this way, hunters having the display unit 16 may locate dogs provided with the locator unit 12 that have moved out of sight and are on a stationary point, an outfitter having the display unit 16 may accurately determine the position of each of his hunters having the locator unit 12, or the position of a vehicle having the locator unit 12 to which all need to return may be determined. There are many additional applications of the technology.

As discussed above, the locator unit 12 preferably includes the position calculator module 22 and the wireless communications module 24, which may include a short range RF communications transceiver module. The display unit 16 includes the position calculator module 62; the wireless communication module 64, which may include a short range RF communications transceiver module; and the user interface 66, which may include a special purpose graphical display with custom keyboard. In each unit 12 and 16, power is supplied by the power source 28 or 70, which may include one or more batteries. The position calculator modules 22 and 62 include the processors 40 or 82, the memory modules 34 or 76, the satellite receivers 30 or 72, and sensors 36 or 78. The sensors 36 and 78 may include a two-axis accelerometer and a compass.

In one example, the locator unit 12 is designed to be mounted on a dog collar and packaged accordingly. When activated, it receives satellite position data via the satellite position receiver 30. Each satellite position update is stored in the memory module 34, and the position calculator module 22 collects local position data to calculate movement from the point at which the satellite position data was received. Thus, the object's 14 augmented position is continually updated. When the next satellite position signal is received, the local position data is reset, and the calculation is started again. Periodically, the locator unit 12 transmits its augmented position via the wireless communication module 24, e.g. an RF transceiver, by combining the satellite position data with the local position data to create an accurate, current set of co-ordinates for example. The data transmission is encoded so that the data can only be received by the locator unit's 12 companion display unit 16 (e.g. operating with same group ID).

In another example, the locator unit 12 may also receive augmented position data from other active locators units 12 having a common or corresponding property, such as a same group ID; store the data in the memory module 76; and re-transmit the data along with its own augmented position data at its next assigned transmission time. In this embodiment, each locator unit's 12 position information can be time stamped. If multiple locator units 12 are active, each unit can be assigned a time slice within the total transmission cycle in which to transmit position information. In this embodiment, only one locator unit will preferably transmit at a given time, although simultaneous communication can be used. The display unit 16 desirably receives each active locator unit's 12 transmission, determines if the data received is new based upon each message's optional time stamp, calculates the relative position data (with respect to the display unit 16) for each active locator unit 12 for which a signal has been received, and outputs, e.g. displays, each locator unit's 12 relative position via the user interface 66. Unit number, distance of the locator unit 12 from the display unit 16 in feet, and direction from the display unit may be displayed for each locator unit 12. An arrow may also be displayed to indicate direction of movement, if any. The display unit 16 optionally indicates that the object 14 is stationary by not displaying an arrow for example. If more than one locator unit 12 is found within a predetermined area, e.g. a ten (10) meter radius, multiple unit numbers may be shown for one display object.

Set up is typically performed each time the system 10 is activated and one of a variety of suitable setup methods will be described hereafter. First, the display unit 16 is powered on and placed in setup mode. Then, locator units 12 are desirably powered on one at a time. The display unit 16 will transmit its group ID and number of active locator units 12 found until setup mode is turned off. As a locator unit 12 is powered up, it will receive the group ID and active locator ID, assign the next available ID number to itself, and transmit that information to the display unit 16. When all active locator unit's 12 have been set up, the display unit 16 operation is then changed to locate mode.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes my be made which will readily suggest themselves to those skilled in the art and which are accomplished in the spirit of the invention disclosed and as defined in the appended claims.

What is claimed is:

1. A system for tracking the identity and position of one or more hunting dogs, the system comprising:
    a locator unit, comprising:
        a housing attached to a collar of the hunting dog;
        a position calculator module supported by the housing, the position calculator module comprising:
            a satellite receiver receiving transmissions from a satellite positioning system, the satellite receiver outputting a signal containing satellite position data for the hunting dog;
            a plurality of sensors measuring real-time local position data of the hunting dog including direction and speed travelled and outputting a signal containing the local position data, wherein the plurality of sensors comprise accelerometers to measure real-time changes in acceleration of the hunting dog indicative of the direction and speed travelled by the hunting dog;
            a memory module receiving the signal from the satellite receiver and The plurality of sensors, the memory module storing the satellite position data and the local position data;
            a processor interfacing with the memory module to retrieve satellite position data and local position data, the processor augmenting satellite position data by combining the satellite position data with local position data, and the processor interfacing with the memory module to store combined position data, the processor outputting a signal containing the combined position data wherein the local position data is zeroed when transmissions from the satellite position system are received; and,
        a wireless communication module supported by the housing, the wireless communication module receiving the signal from the processor, the wireless communication module transmitting the combined position data to a display unit;
    a display unit, comprising:
        a housing;
        a wireless communication module supported by the housing, the wireless communication module receiving the combined position data from the locator unit, the wireless communication module outputting a signal containing the combined position data.

2. The system of claim 1, wherein the wireless communication module of the locator unit transmits the hunting dog's combined position data with a unique locator ID.

3. The system of claim 2, wherein the wireless communication module of the locator unit transmits the hunting dog's combined position data with a group ID.

4. The system of claim 1, wherein at least one of the locator unit or the display unit relays combined position data from a second locator unit.

5. The system of claim 1, wherein the display unit further comprises a user interface supported by the housing, the user interface receiving the signal from the wireless communication module and outputting the hunting dog's combined position in a format perceivable by the user.

6. The system of claim 1, wherein the display unit further comprises:
    a memory module supported by the housing, the memory module receiving the signal from the wireless communication module and storing the hunting dog's combined position data, the memory module selectively outputting signals containing the hunting dog's combined position data; and,
    a user interface supported by the housing, the user interface receiving signals from at least one of the wireless communication module and the memory module, the user interface outputting the hunting dog's combined position in a format perceivable by the user.

7. The system of claim 6, wherein the user interface receives commands from a user and outputs signals to the memory module to retrieve previously-stored combined position data.

8. The system of claim 1, wherein the display unit further comprises:
    a position calculator module supported by the housing, the position calculator module having:
        a satellite receiver receiving transmissions from a satellite positioning system, the satellite receiver outputting a signal containing satellite position data for the display unit;
        a plurality of sensors measuring local position data of the display unit including direction and speed travelled and outputting a signal containing the local position data, wherein the plurality of sensors comprise accelerometers to measure real-time changes in acceleration of the position calculator module indicative of the direction and speed travelled;
        a memory module receiving the signals from the satellite receiver and the sensor, the memory module storing the satellite position data and the local position data;
        a processor interfacing with the memory module to retrieve satellite position data and local position data, the processor augmenting satellite position data by combining the satellite position data with local position data and interfacing with the memory module to store combined position data for the display unit, the processor outputting a signal containing the display unit's combined position data.

9. The system of claim 8, wherein the processor receives the signal from the wireless communication module and stores the hunting dog's combined position data in the memory module, the processor selectively outputting signals containing the hunting dog's combined position data.

10. The system of claim 8, further comprising a user interface supported by the housing, the user interface receiving signals from at least one of the wireless communication module and the processor, the user interface outputting the hunting dod's combined position in a format perceivable by the user.

11. The system of claim 10, wherein the user interface receives commands from a user and outputs a signal to the memory module to request previously-stored position data.

12. The system of claim 8, wherein the wireless communication module of the display unit receives the signal from the processor and transmits the combined position data for the display unit.

13. The system of claim 12, wherein the display unit is capable of relaying combined position data from at least one of the locator unit or a second display unit.

14. A locator unit for tracking the identity and position of one or more hunting dog's, the locator unit comprising:
   a housing attached to a collar for the hunting dog;
   a position calculator module supported by the housing, the position calculator module having:
      a satellite receiver receiving transmissions from a satellite positioning system, the satellite receiver outputting a signal containing satellite position data;
      a plurality of sensors measuring real-time local position data of the hunting dog including direction and speed travelled and outputting a signal containing the local position data, wherein the plurality of sensors comprise accelerometers to measure real-time changes in acceleration of the hunting dog indicative of the direction and speed travelled by the hunting dog;
      a memory module receiving the signal from the satellite receiver and the plurality of sensor, the memory module storing the satellite position data and the local position data;
      a processor interfacing with the memory module to retrieve satellite position data and local position data, the processor augmenting satellite position data by combining the satellite position data with local position data and the processor interfacing with the memory module to store combined position data, the processor outputting a signal containing the hunting dog's combined position data wherein the local position data is zeroed when transmissions from the satellite position system are received; and
   a wireless communication module supported by the housing, the wireless communication module receiving the signal from the processor and transmitting the combined position data.

15. The locator unit of claim 14, wherein the locator unit relays combined position data from at least one of another locator unit or a display unit.

16. A method for tracking the identity and position of a hunting dog, the method comprising the steps of:
   attaching a locator unit to a collar of the hunting dog;
   receiving transmissions from a satellite positioning system;
   measuring local position data of the hunting dog including direction and speed travelled via the locator unit having a plurality of sensors, wherein the plurality 1f sensors comprise accelerometers to measure real-time changes in acceleration of the hunting dog indicative of the direction and speed travelled by the hunting dog;
   augmenting the satellite position data with the local position data with the local position data wherein the local position data is zeroed when transmissions from the satellite position system are received;
   transmitting the hunting dog's augmented position data to a display unit; and,
   receiving the hunting dog's augmented position data at the display unit.

17. The method of claim 16, further comprising the step of outputting the hunting dog's combined position via a user interface.

18. The method of claim 16, further comprising the step of storing the hunting dog's combined position data at the display unit.

19. The method of claim 18, further comprising the step of retrieving previously-stored combined position data for the hunting dog and outputting the hunting dog's previously-stored combined position data via a user interface.

20. The method of claim 16, further comprising the steps of:
   receiving transmissions from a satellite positioning system to determine the position of the display unit;
   measuring local position data of the hunting dog including direction and speed travelled via the locator unit having a plurality of sensors, wherein the plurality of sensors comprise accelerometers to measure real-time changes in acceleration of the hunting dog indicative of the direction and speed travelled by the hunting dog; and
   augmenting the satellite position data with the local position data with the local position data.

21. The method of claim 20, further comprising the step of transmitting the combined position data of the display unit. combined position data of the display unit.

22. The method of claim 20, further comprising the step of outputting at least one of the hunting dog's or the display unit's combined position via a user interface.

23. The method of claim 20, further comprising the step of storing the hunting dog's combined position data.

24. The method of claim 23, further comprising the step of retrieving previously-stored combined position data and outputting at least one of the hunting dog's previously-stored combined position and the display unit's previously-stored combined position via a user interface.

25. The method of claim 23, further comprising the step of calculating the hunting dog's position relative to the display unit's position.

26. The method of claim 25, further comprising the step of outputting the relative position of the object via a user interface.

27. The method of claim 25, further comprising the step of storing the hunting dog's relative position.

28. The method of claim 27, further comprising the step of retrieving previously-stored relative position data and outputting hunting dog's previously-stored relative position via a user interface.

* * * * *

UNITED STATES PATENT AND TRADEMARK OFFICE
CERTIFICATE OF CORRECTION

| | |
|---|---|
| PATENT NO. | : 7,847,727 B2 |
| APPLICATION NO. | : 11/511838 |
| DATED | : December 7, 2010 |
| INVENTOR(S) | : Charles R. Hensley, Charles Jones and Kipton Moravec |

It is certified that error appears in the above-identified patent and that said Letters Patent is hereby corrected as shown below:

In the Claims:

Column 11, line 55: After "receiver and" delete "The" and replace with -- the --
Column 13, line 12: Delete "dod's" and replace with -- dog's --
Column 14, line 3: After "the plurality" delete "If" and replace with -- of --
Column 14, lines 7-8: After "satellite position data" delete "with the local position data" and replace with -- by combining the satellite position data --
Column 14, line 35: After "satellite position data" delete "with the local position data" and replace with -- by combining the satellite position data --
Column 14, line 39: Delete "combined position data of the display unit."
Column 14, line 55: Delete "object" and replace with -- hunting dog --

Signed and Sealed this
Twenty-second Day of February, 2011

David J. Kappos
*Director of the United States Patent and Trademark Office*